US011359048B2

(12) United States Patent
Spyrou et al.

(10) Patent No.: US 11,359,048 B2
(45) Date of Patent: *Jun. 14, 2022

(54) FAST-CURING EPOXY SYSTEMS

(71) Applicant: Evonik Operations GmbH, Essen (DE)

(72) Inventors: Emmanouil Spyrou, Schermbeck (DE); Dirk Fuchsmann, Haltern am See (DE); Britta Kohlstruk, Gladbeck (DE); Annette Sandkühler, Marl (DE)

(73) Assignee: Evonik Operations GmbH, Essen (DE)

( * ) Notice: Subject to any disclaimer, the term of this patent is extended or adjusted under 35 U.S.C. 154(b) by 29 days.

This patent is subject to a terminal disclaimer.

(21) Appl. No.: 16/408,725

(22) Filed: May 10, 2019

(65) Prior Publication Data

US 2019/0352451 A1 Nov. 21, 2019

(30) Foreign Application Priority Data

May 17, 2018 (EP) .................................... 18172949

(51) Int. Cl.
| | | |
|---|---|---|
| *C08G 59/50* | (2006.01) | |
| *C08G 59/56* | (2006.01) | |
| *C08G 59/68* | (2006.01) | |
| *C08G 59/24* | (2006.01) | |
| *C08L 63/02* | (2006.01) | |
| *C09D 163/02* | (2006.01) | |
| *C09J 163/02* | (2006.01) | |
| *C08G 59/28* | (2006.01) | |
| *C09D 163/00* | (2006.01) | |
| *C09J 163/00* | (2006.01) | |

(Continued)

(52) U.S. Cl.
CPC ....... *C08G 59/5046* (2013.01); *C08G 59/245* (2013.01); *C08G 59/28* (2013.01); *C09D 163/00* (2013.01); *C09J 163/00* (2013.01); C08G 59/5026 (2013.01); C08G 59/5033 (2013.01); C08K 5/19 (2013.01); C08K 5/50 (2013.01)

(58) Field of Classification Search
USPC .......................................................... 523/429
See application file for complete search history.

(56) References Cited

U.S. PATENT DOCUMENTS 2,633,458 A * 3/1953 Shokal .................. C08G 59/66
                                                    525/510
2,928,794 A 3/1960 Belanger et al.

(Continued)

FOREIGN PATENT DOCUMENTS

| CA | 1312174 | 12/1992 |
|---|---|---|
| CA | 2145589 A1 | 9/1995 |

(Continued)

OTHER PUBLICATIONS

European Search Report dated Sep. 24, 2018 in EP 1817949.2 (7 pages).
Spyrou et al., U.S. Appl. No. 16/408,794, filed May 10, 2019.
Spyrou et al., U.S. Appl. No. 16/408,895, filed May 10, 2019.
Spyrou et al., U.S. Appl. No. 16/409,907, filed May 13, 2019.
Kreczinski et al., U.S. Appl. No. 16/354,349, filed Mar. 15, 2019.
Kreczinski et al., U.S. Appl. No. 16/354,753, filed Mar. 15, 2019.
Kreczinski et al., U.S. Appl. No. 16/356,026, filed Mar. 18, 2019.
Kreczinski et al., U.S. Appl. No. 16/356,081, filed Mar. 18, 2019.

(Continued)

*Primary Examiner* — Michael J Feely
(74) *Attorney, Agent, or Firm* — Taylor English Duma LLP; Philip P. McCann

(57) ABSTRACT

The present invention provides a composition comprising
a) at least one epoxy resin,
b) at least one cyclic amine of the formula (I)

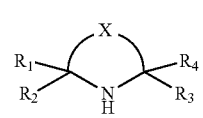

(I)

in which
$R^1$ to $R^4$ is H or an organic radical,
with the proviso that at least one of the $R^1$, $R^2$, $R^3$ and $R^4$ radicals =H, and $$X\!=\!-\!(Y^1)_m\!-\!(A^1)_n\!-\!(Y^2)_o\!-\!(A^2)_p\!-\!(Y^3)_q\!-\!(A^3)_r\!-\!(Y^4)_s\!-\!$$ (II)

where, independently of one another,
m, n, o, p, q, r and s=0 or 1,
$A^1$, $A^2$, $A^3$=alkylene or alkenylene radical and
$Y^1$, $Y^2$, $Y^3$, $Y^4$=$NR^5$, $PR^5$, O or S, where $R^5$ independently=organic radical,
where any two organic radicals selected from $R^1$ to $R^5$ and any radicals present in the alkylene and/or alkenylene radicals $A^1$, $A^2$, $A^3$ may also form one or more further rings,
with the proviso that at least one of the radicals selected from $R^1$ to $R^5$ present and any radicals present in the alkylene and/or alkenylene radicals $A^1$, $A^2$, $A^3$ is substituted by at least one —$NHR^6$ or —$NH_2$ group, where $R^6$=organic radical, and
c) at least one salt of a strong Brønsted acid with a counterion selected from metal ions, metal-containing ions, phosphonium ions and unsubstituted ammonium ions, where the ratio of the epoxy groups in the epoxy resin to the sum total of all NH groups in all amines is 0.5:1 to 1.5:1, and to processes for production thereof and use thereof.

19 Claims, No Drawings

(51) Int. Cl.
*C08K 5/19* (2006.01)
*C08K 5/50* (2006.01)

(56) References Cited

U.S. PATENT DOCUMENTS

| | | | |
|---|---|---|---|
| 2,965,609 A * | 12/1960 | Newey | C08G 59/5073 |
| | | | 528/118 |
| 3,055,901 A | 9/1962 | Speranza et al. | |
| 3,277,049 A | 10/1966 | Green | |
| 3,492,269 A | 1/1970 | Janssen et al. | |
| 3,649,589 A | 3/1972 | Mayfield | |
| 4,101,459 A * | 7/1978 | Andrews | C08G 59/687 |
| | | | 528/90 |
| 4,775,734 A | 10/1988 | Goel | |
| 5,441,000 A | 8/1995 | Vatsky et al. | |
| 5,470,896 A | 11/1995 | Wegmann et al. | |
| 5,629,380 A | 5/1997 | Baldwin et al. | |
| 5,707,702 A | 1/1998 | Brady et al. | |
| 5,847,027 A | 12/1998 | Marten et al. | |
| 6,355,763 B1 * | 3/2002 | Scherzer | C08G 59/686 |
| | | | 525/423 |
| 8,951,619 B2 | 2/2015 | Wilmot et al. | |
| 8,980,979 B2 | 3/2015 | Dettloff et al. | |
| 9,006,385 B2 | 4/2015 | Wilmot et al. | |
| 9,346,911 B2 | 5/2016 | Schrötz et al. | |
| 9,567,480 B2 | 2/2017 | Vogel et al. | |
| 9,686,898 B2 | 6/2017 | Ortelt et al. | |
| 9,840,588 B2 | 12/2017 | Corley et al. | |
| 9,862,673 B2 | 1/2018 | Rüfer et al. | |
| 9,868,702 B2 | 1/2018 | Rüfer et al. | |
| 9,994,671 B2 | 6/2018 | Fuchsmann et al. | |
| 10,093,159 B1 | 10/2018 | Zichettello et al. | |
| 10,093,765 B2 | 10/2018 | Stache et al. | |
| 10,093,826 B2 | 10/2018 | Stache et al. | |
| 10,160,717 B2 | 12/2018 | Rüfer et al. | |
| 10,173,979 B2 | 1/2019 | Rüfer et al. | |
| 10,214,612 B2 | 2/2019 | Langkabel et al. | |
| 10,221,277 B2 | 3/2019 | Langkabel et al. | |
| 10,252,980 B1 | 4/2019 | Rüfer et al. | |
| 10,280,252 B2 | 5/2019 | Balthasar et al. | |
| 10,384,977 B2 | 8/2019 | Fuchsmann et al. | |
| 10,472,460 B2 | 11/2019 | Fuchsmann et al. | |
| 10,611,782 B2 | 4/2020 | Kreczinski et al. | |
| 10,626,131 B2 | 4/2020 | Kreczinski et al. | |
| 10,633,401 B2 | 4/2020 | Kreczinski et al. | |
| 10,669,293 B2 | 6/2020 | Kreczinski et al. | |
| 2002/0187305 A1 | 12/2002 | Czaplicki et al. | |
| 2005/0119372 A1 | 6/2005 | Czaplicki et al. | |
| 2005/0215757 A1 | 9/2005 | Kobayashi et al. | |
| 2006/0188726 A1 | 8/2006 | Muenz et al. | |
| 2009/0226729 A1 | 9/2009 | Niimoto et al. | |
| 2010/0273005 A1 | 10/2010 | Kramer et al. | |
| 2011/0126980 A1 | 6/2011 | Campbell et al. | |
| 2011/0152448 A1 | 6/2011 | Corley et al. | |
| 2011/0281117 A1 | 11/2011 | Fuchsmann et al. | |
| 2012/0010330 A1 | 1/2012 | Dettloff et al. | |
| 2012/0024224 A1 | 2/2012 | Nanchiku et al. | |
| 2014/0171551 A1 | 6/2014 | Patel et al. | |
| 2014/0296381 A1 | 10/2014 | Schrotz et al. | |
| 2015/0094400 A1 | 4/2015 | Zheng et al. | |
| 2015/0140675 A1 | 5/2015 | Xu | |
| 2015/0232717 A1 * | 8/2015 | Tran | C09J 163/00 |
| | | | 156/330 |
| 2017/0240691 A1 | 8/2017 | Zheng et al. | |
| 2017/0355810 A1 | 12/2017 | Langkabel et al. | |
| 2017/0369372 A1 | 12/2017 | Fuchsmann et al. | |
| 2018/0127980 A1 | 5/2018 | Fuchsmann et al. | |
| 2018/0155515 A1 | 6/2018 | Spyrou et al. | |
| 2018/0327538 A1 | 11/2018 | Lomölder et al. | |
| 2019/0300549 A1 | 10/2019 | Kreczinski et al. | |
| 2019/0300550 A1 | 10/2019 | Kreczinski et al. | |
| 2019/0300551 A1 | 10/2019 | Kreczinski et al. | |
| 2019/0300553 A1 | 10/2019 | Kreczinski et al. | |
| 2019/0352449 A1 * | 11/2019 | Spyrou | C08G 59/508 |
| 2019/0352450 A1 * | 11/2019 | Spyrou | C09J 163/00 |
| 2019/0352452 A1 * | 11/2019 | Spyrou | C08G 59/5073 |
| 2020/0079894 A1 | 3/2020 | Unkelhäußer et al. | |
| 2020/0172723 A1 | 6/2020 | Spyrou et al. | |

FOREIGN PATENT DOCUMENTS

| | | |
|---|---|---|
| CA | 2165585 A1 | 6/1996 |
| CN | 102858837 | 1/2013 |
| CN | 103974993 | 8/2014 |
| CN | 106833261 A | 6/2017 |
| CN | 106905816 A | 6/2017 |
| CN | 108047649 | 5/2018 |
| DE | 1954701 A1 | 5/1971 |
| DE | 10 2009 028019 A1 | 8/2010 |
| EP | 0083813 A1 | 7/1983 |
| EP | 0 291 455 | 11/1988 |
| EP | 0 604 363 A2 | 6/1994 |
| EP | 0 675 185 A2 | 10/1995 |
| EP | 0675182 A1 | 10/1995 |
| EP | 0969030 A1 | 1/2000 |
| EP | 1 047 740 A1 | 11/2000 |
| EP | 2957584 A1 | 12/2015 |
| EP | 3 162 829 A1 | 5/2017 |
| EP | 3255078 A1 | 12/2017 |
| GB | 1105772 | 3/1968 |
| GB | 2332202 | 6/1999 |
| JP | H08-113876 A | 5/1996 |
| WO | 96/09352 A1 | 3/1996 |
| WO | 99/29790 A1 | 6/1999 |
| WO | 2010/107539 A1 | 9/2010 |
| WO | 2017/074810 A1 | 5/2017 |
| WO | 2018/000125 A1 | 1/2018 |

OTHER PUBLICATIONS

Beyer et al., Lehrbuch der organischen Chemie, 21. Auflage, Hirzelverlag 1988, p. 272 (1 page).
Beyer et al., Lehrbuch der organ ischen Chemie, 21. Auflage, Hirzelverlag 1988, p. 324 (1 page).
Bordwell, "Equilibrium Acidities in Dimethyl Sulfoxide Solution," copyright 1988, Acc. Chem. Res., vol. 21, pp. 456-463 (8 pages).
Hollemann, Lehrbuch der anorganischen Chemie, 91-100, Auflage, Walter der Gruyter Verlag, Berlin, New York, 1985, p. 603 (1 page).
Lee et al., Handbook of Epoxy Resins, Chapter 2, Synthesis of Glycidyl-Type Epoxy Resins, pp. 2-2 to 2-33 (35 pages).
Paquin et al., Epoxidverbindungen und Epoxidharze Kapitel IV (52 pages).
Römpp, Lexikon Chemie, 9. Auflage, Georg Thieme Verlag, Stuttgart, New York, 1991, p. 3459 (1 page).
Römpp, Lexikon Chemie, 9. Auflage, Georg Thieme Verlag, Stuttgart, New York, 1991, pp. 4580-4581 (1 page).
Tetrafluoroboric Acid, Encyclopedia of Reagents for Organic Synthesis, pp. 4762-4765 (4 pages).
European Search Report dated Jun. 6, 2019 in EP 18209073.8 (6 pages).
European Search Report dated Sep. 24, 2018 in EP 18172951.8 (7 pages).
European Search Report dated Sep. 24, 2018 in EP 18172954.2 (7 pages).
European Search Report dated Sep. 24, 2018 in EP 1817950.0 (7 pages).
Hexafluoroantimonsäure, pKs-Wert—17 (1 page).
Hexafluorophosphorsäure, pKs-Wert-10 (1 page).
International Search Report dated Dec. 26, 2018 in PCT/CN2018/101583 (3 pages).
Lee et al., "Handbook of Epoxy Resins," McGraw Hill, New York, 1967, pp. 5-1 to 5-24 (13 pages).
Trummal et al., "Acidity of Strong Acids in Water and Dimethyl Sulfoxide," copyright 2016, J. Phys. Chem. A, vol. 120, pp. 3663-3669 (7 pages).
Written Opinion dated Dec. 26, 2018 in PCT/CN2018/101583 (4 pages).

* cited by examiner

FAST-CURING EPOXY SYSTEMS

CROSS REFERENCE TO RELATED APPLICATIONS

This application is a 35 U.S.C. § 119 patent application which claims the benefit of European Application No. 18172949.2 filed May 17, 2018, which is incorporated herein by reference in its entirety.

FIELD

The present invention provides compositions comprising at least one epoxy resin, at least one cyclic amine and a salt of a strong Brønsted acid.

BACKGROUND

Epoxy resins, especially those that are prepared from bisphenol A and epichlorohydrin, are known raw materials for the production of high-quality casting resins, coating compositions, composites and adhesives. Aromatic epoxy resins cured with polyamines have not only good chemical and solvent resistance but also good bond strength on many substrates.

The curing of epoxy-amine coating systems can be accelerated using catalysts (U.S. Pat. Nos. 3,492,269 A, 5,470,896 A, GB 1,105,772 A).

EP 0 083 813 A1, EP 2 957 584 A1, U.S. Pat. Nos. 5,441,000 A, 5,629,380 A, WO 96/09352 A1 disclose the catalysed curing of epoxy resins with various amines.

Cyclic amines show advantages in epoxy curing. U.S. Pat. Nos. 8,951,619 B2 and 9,006,385 B2 disclose, inter alia, the catalyst-free curing of epoxy resins with N-substituted piperazines.

CN 106905816 A, CN 106833261 A, JP H08-113876 A, DE 1 954 701 A1, CA 2 165 585 A1 and U.S. Pat. No. 3,055,901 A disclose the catalyst-free curing of epoxy resins with aminoethylpiperazine.

U.S. Pat. No. 8,980,979 B2 discloses the curing of an epoxy resin with, inter alia, a cyclic diamine selected from piperazine and homopiperazine, optionally in the presence of a catalyst.

EP 0 969 030 A1 discloses epoxy/amine coating systems wherein the amine component is an aliphatic amine. The compositions may include a catalyst. In the examples, the hardener used is aminoethylpiperazine.

U.S. Pat. No. 4,775,734 A discloses the curing of epoxy resins with aminoethylpiperazine using catalytic amounts of tetrafluoroborate or hexafluorophosphate salts of various amines. Also disclosed in comparative examples (Example 2) is an attempt to cure epoxy resins with aminoethylpiperazine in the presence of lithium tetrafluoroborate. However, there is no reaction at the ratio of epoxy groups:NH groups used. In addition, in a comparative example (in Example 9), epoxy resin is cured with aminoethylpiperazine in the presence of imidazoline. However, the imidazoline use has the disadvantage that it is not storage-stable in the presence of moist materials and has a tendency to yellow.

EP 3 255 078 A1 discloses epoxy resin compositions comprising at least one epoxy compound, 2-(2,2,6,6-tetramethylpiperidin-4-yl)propane-1,3-diamine, and optionally a catalyst which may be an inorganic salt inter alia.

WO 2017/074810 A1 discloses compositions comprising an epoxy resin, a polyetheramine and a further amine hardener which may be an imidazole or imidazoline inter alia, and a metal triflate catalyst.

A common factor in the prior art compositions is that they do not cure at all or do so too slowly or only at high temperatures.

For many applications, however, it is important that surface curing or complete through-curing proceeds particularly rapidly or else at low temperatures. Firstly, productivity can be increased or else the next processing step can be accelerated. The latter is important particularly in cold regions in order, for example, to provide ships or pipelines with a corrosion protection coating, such that continued operation is possible there in winter as well.

SUMMARY

The problem addressed in the present context is thus that of providing epoxy systems that react much more quickly under the same conditions than the formulations known to date. Another problem addressed was that of providing epoxy formulations that partly or fully cure more quickly than is possible to date at temperatures well below room temperature.

DETAILED DESCRIPTION

These present problems are solved by the compositions according to the invention comprising
a) at least one epoxy resin,
b) at least one cyclic amine of the formula (I)

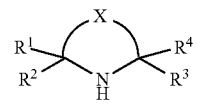

in which
$R^1$ to $R^4$ is H or an organic radical,
with the proviso that at least one of the $R^1$, $R^2$, $R^3$ and $R^4$ radicals =H, and $$X=-(Y^1)_m-(A^1)_n-(Y^2)_o-(A^2)_p-(Y^3)_q-(A^3)_r-(Y^4)_s- \quad (II)$$

where, independently of one another,
m, n, o, p, q, r and s=0 or 1,
$A^1$, $A^2$, $A^3$ =alkylene or alkenylene radical and
$Y^1$, $Y^2$, $Y^3$, $Y^4$=$NR^5$, $PR^5$, O or S, with $R^5$ independently=organic radical,
where any two organic radicals selected from $R^1$ to $R^5$ and any radicals present in the alkylene and/or alkenylene radicals $A^1$, $A^2$, $A^3$ may also form one or more further rings,
with the proviso that at least one of the radicals selected from $R^1$ to $R^5$ present and any radicals present in the alkylene and/or alkenylene radicals $A^1$, $A^2$, $A^3$ is substituted by at least one —$NHR^6$ or —$NH_2$ group, where $R^6$=organic radical, and
c) at least one salt of a strong Brønsted acid with a counterion selected from metal ions, metal-containing ions, phosphonium ions and unsubstituted ammonium ions, where the ratio of the epoxy groups in the epoxy resin to the sum total of all NH groups in all amines is 0.5:1 to 1.5:1.

Component a) is at least one epoxy resin. All epoxy compounds are suitable in principle for this purpose.

Suitable epoxy compounds are described, for example, in EP 675 185 A2. Useful compounds are a multitude of the known compounds containing more than one epoxy group, preferably two epoxy groups, per molecule. These epoxy compounds may be either saturated or unsaturated and aliphatic, cycloaliphatic, aromatic or heterocyclic and may also have hydroxyl groups. They may additionally contain such substituents that do not cause any troublesome side reactions under the mixing or reaction conditions, for example alkyl or aryl substituents or ether moieties.

Preferred epoxy compounds here are glycidyl ethers which derive from polyhydric phenols, especially bisphenols and novolaks, and which have molar masses based on the number of epoxy groups ME ("epoxy equivalent weights", "EV value") between 100 and 1500 g/eq, but especially between 150 and 250 g/eq.

Particularly preferred epoxy compounds derive from resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone, and the chlorination and bromination products of the aforementioned compounds (for example tetrabromobisphenol A).

Very particular preference is given to using liquid diglycidyl ethers based on bisphenol A and bisphenol F having an epoxy equivalent weight of 150 to 200 g/eq.

It is also possible with preference to use polyglycidyl ethers of polyalcohols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components A) preferably include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. However, the poly(N-glycidyl) compounds also include triglycidyl isocyanurate, triglycidylurazole and oligomers thereof, N,N'-diglycidyl derivatives of cycloalkyleneureas and diglycidyl derivatives of hydantoins.

In addition, it is also possible with preference to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Also preferred are glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30% by weight, preferably 10% to 20% by weight, based on the mass of the polyglycidyl ethers.

A detailed enumeration of the suitable epoxy compounds can be found in the handbook "Epoxidverbindungen and Epoxidharze" [Epoxy Compounds and Epoxy Resins] by A. M. Paquin, Springer Verlag, Berlin 1958, Chapter IV, and in Lee Neville "Handbook of Epoxy Resins", 1967, Chapter 2.

Useful epoxy compounds preferably include glycidyl ethers and glycidyl esters, aliphatic epoxides, diglycidyl ethers based on bisphenol A and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of Versatic acid (trade name: CARDURA E10, Shell), 3,4-epoxycyclohexylmethyl 3',4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups.

It is also possible to use mixtures of the epoxy compounds mentioned.

Particularly preferred epoxy resins are polyepoxides based on bisphenol A diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate.

Preference is given to using mixtures of the aforementioned epoxy compounds as component A).

Useful cyclic amines b) in principle include any compounds which, as NH carrier, have exactly one cyclic, i.e. ring-attached, NH group and at least one non-ring-attached primary or secondary amino group. In addition, however, the amines used in accordance with the invention may also have tertiary amino groups that are unreactive.

The amines b) have the formula (I)

in which

R$^1$ to R$^4$ is H or an organic radical,
with the proviso that at least one of the R$^1$, R$^2$, R$^3$ and R$^4$ radicals =H, and $$X=-(Y^1)_m-(A^1)_n-(Y^2)_o-(A^2)_p-(Y^3)_q-(A^3)_r-(Y^4)_s- \quad (II)$$

where, independently of one another,
m, n, o, p, q, r and s=0 or 1,
A$^1$, A$^2$A$^3$=alkylene or alkenylene radical and
Y$^1$, Y$^2$, Y$^3$, Y$^4$=NR$^5$, PR$^5$, O or S, where R$^5$=organic radical,
where any two organic radicals selected from R$^1$ to R$^5$ and any radicals present in the alkylene and/or alkenylene radicals A$^1$, A$^2$, A$^3$ may also form one or more further rings, with the proviso that at least one of the radicals selected from R$^1$ to R$^5$ present and any radicals present in the alkylene and/or alkenylene radicals A$^1$, A$^2$, A$^3$ is substituted by at least one —NHR$^6$ or —NH$_2$ group, where R$^6$ =organic radical.

The cyclic amines are saturated or partly unsaturated in relation to the ring shown in formula (I). Corresponding amines react more quickly than corresponding aromatic amines and imidazolines. Further rings optionally present in the cyclic amine may be not only saturated or unsaturated, but also aromatic.

Preferred cyclic amines are saturated in relation to the ring shown in formula (I).

The carbon atoms adjacent to the ring-attached amino group, since at least one of the R$^1$, R$^2$, R$^3$ and R$^4$ radicals =H, are unsubstituted at at least one site overall. Corresponding amines react more quickly than amines in which all four R$^1$, R$^2$, R$^3$ and R$^4$ radicals ≠H. Preferably at least two, further preferably at least three and more preferably all of the R$^1$, R$^2$, R$^3$ and R$^4$ radicals =H.

In the X radical, if present, A$^1$, A$^2$ and A$^3$ are independently alkylene or alkenylene radicals. These may in turn bear organic radicals. If the alkylene and/or alkenylene radicals themselves have one or more organic radicals, any two organic radicals are selected from the organic radicals in the alkylene and/or alkenylene radicals may also form one or more further rings with one another or with any organic R$^1$ to R$^5$ radicals present.

Preferably, A$^1$, A$^2$ and A$^3$, if present, each independently have the formula (III)

$$-(CR^7R^8)_x-(CR^9=CR^{10})_y-(CR^{11}R^{12})_z- \quad (III)$$

in which, independently of one another,
R$^7$, R$^8$, R$^9$, R$^{10}$, R$^{11}$ and R$^{12}$=H or organic radical and
1≤x+y+z≤7.

The indices x, y and z, in accordance with their pertinence to the A$^1$, A$^2$ and A$^3$ radical, may preferably also be referred to as indices x$^1$, y$^1$ and z$^1$, as x$^2$, y$^2$ and z$^2$ and as x$^3$, y$^3$ and z$^3$.

Preferably, X has a chain length of 2 to 15 atoms. Preferably, the sum total of all x, ½·y and z and of m, o, q and s has a value from 2 to 15, further preferably a value from 2 to 8, even further preferably a value from 2 to 5 and most preferably a value from 2 to 4. In other words, preferably, 2≤m+o+q+s+x$^1$+½·y$^1$+z$^1$+x$^2$30 ½·y$^2$+z$^2$+x$^3$+½·y$^3$+z$^3$≤15. Further preferably, 2≤m+o+q+s+x$^1$+½·y$^1$+z$^1$+x$^2$30 ½·y$^2$+z$^2$+x$^3$+½·y$^3$+z$^3$≤8, further preferably, 2≤m+o+q+s+x$^1$+½·y$^1$+z$^1$+x$^2$30 ½·y$^2$+z$^2$+x$^3$+½·y$^3$+z$^3$≤5, most preferably, 2≤m+o+q+s+x$^1$+½·y$^1$+z$^1$+x$^2$30 ½·y$^2$+z$^2$+x$^3$+½·y$^3$+z$^3$≤4.

The amines of the formula (I) are (optionally bi/poly) cyclic compounds since both carbon atoms adjacent to the amino group are attached on either side to the substituted (hetero)alkylene radical of the formula (II).

Further preferably, formula (I), as well as the nitrogen atom of the ring-attached NH group, has not more than one further heteroatom in the cycle, i.e. X preferably has the formula (IIa)

$$X=-(CR^7R^8)_x-(Y)_o-(CR^{11}R^{12})_z- \quad (IIa)$$

with
x and z=0, 1, 2, 3, 4, 5, 6 or 7,
o=0 or 1,
2≤x+o+z≤15
R$^7$, R$^8$, R$^{11}$, R$^{12}$=H or organic radical and
Y=NR$^5$, PR$^5$, O or S, where R$^5$=organic radical.

Correspondingly, in formula (I), any two organic radicals selected from R$^1$ to R$^8$, R$^{11}$ and R$^{12}$ may also form one or more further rings, with the proviso that at least one of the radicals selected from R$^1$ to R$^8$, R$^{11}$ and R$^{12}$ present is substituted by at least one —NHR$^6$ or —NH$_2$ group, where R$^6$=organic radical.

In the preferred case that x=2-4 and z=0, the resulting compounds are saturated heteroalkyl ring systems having one NH group. Preferred compounds are pyrrolidines, piperidines and azepanes. In the preferred case that x=1-3, o=1 and n=0-2, the compounds are saturated heteroalkyl ring systems having one NH group and a further heteroatom in the cycle that is not part of a further cyclic NH group. Preferred compounds are singly N-substituted pyrazolidines, singly N-substituted imidazolidines, oxazolidines, thiazolidines, singly N-substituted piperazines, morpholines, thiomorpholines, singly N-substituted diazepanes, oxazepanes and thiazepanes. It is thus preferable, in formula (IIa), that x=1-4, o=0 or 1 and z=0-2.

However, it is also possible to use compounds having three heteroatoms in the cycle. Preference is given especially to the group of the triazinanes and the triazepanes. Especially these compounds may be in bridged form, as, for example, in the case of a particularly preferred group of compounds of the 1,3,6-triazabicyclo[4.2.1]nonanes.

The R$^1$, R$^2$, R$^3$, R$^4$, R$^5$, R$^6$, R$^7$, R$^8$, R$^9$, R$^{10}$, R$^{11}$ and R$^{12}$ radicals may be organic radicals. Preferred organic radicals are alkyl, alkenyl, alkynyl, aryl or aralkyl radicals. These may be heteroatom-substituted within their chain and/or bear substituents. Preferred organic radicals are alkyl, alkenyl, alkynyl, aryl or aralkyl radicals which may bear one or more ether, carboxyl, amino, amido, urea, carbamate, carbonate, amidino or guanidino groups within the chain. In addition, preferred organic radicals may bear one or more substituents selected from organic radicals optionally having ether, carboxyl, amino, amido, urea, carbamate, carbonate, amidino or guanidino groups that may optionally also be substituted by hydroxyl, nitrile or halogen radicals or may themselves be hydroxyl, nitrile or halogen radicals.

Preferred compounds of the formula (I) are aminoethylpiperazine (AEP, 1-(2-aminoethyl)piperazine), 1-(3-aminopropyl)piperazine, 1-imidazolidinoethanamine, imidazolidino-N-propanamine, α-methyl-1-piperazinethanamine, 2,6-dimethyl-1-piperazinoethanamine, 2-amino-1-(piperazin-1-yl)ethanone, 4-(2-aminoethyl)piperidine, 3-(2-aminoethyl)piperidine and 2-(2-aminoethyl)piperidine.

The compounds of the formula (I) may also be used in a mixture.

The compositions according to the invention further comprise at least one salt of a strong Brønsted acid with a counterion selected from metal ions, metal-containing ions, phosphonium ions and unsubstituted ammonium ions. Corresponding salts serve as catalyst. Such a strong acid in the present context is understood to mean a salt having a pKa (or in the case of polyprotic acids having a pKa of the first protolysis stage) of not more than 2. Preferably, the pKa of the corresponding acid is not more than −2. Preferably, the pKa of the strong acid is between 2 and −9.0, more preferably between −2 and −9.0.

The pKa is defined as the negative decadic logarithm of the equilibrium constant Ka and is considered to be a measure of the strength of an acid. The smaller a pKa, the stronger the acid. The pKa is determined as disclosed in F. G. Bordwell, "Equilibrium Acidities in Dimethylsulfoxide Solution", *Acc. Chem. Res.* 1988, 21, 456-463.

Preferred salts are the corresponding salts of the strong acids collated in the first column in Table 1 below:

TABLE 1

| Acid | pK$_A$ | Literature reference, if not disclosed in Bordwell |
|---|---|---|
| Oxalic acid | 1.5 | Beyer Walter, Lehrbuch der organischen Chemie [Organic Chemistry], 21st edition, Hirzelverlag 1988, p. 324 |
| p-Toluenesulfonic acid | 0.7 | Römpp Lexikon Chemie [Römpp's Chemical Lexicon], 10th edition, Georg Thieme Verlag, Stuttgart, New York, Verlag 1999, p. 4580-1. |
| Trifluoroacetic acid | 0.2 | Beyer Walter, Lehrbuch der organischen Chemie, 21st edition, Hirzelverlag 1988, p. 272 |
| Tetrafluoroboric acid | −0.4 | e-EROS Encyclopedia of Reagents for Organic Synthesis, Pages 1-4, Conference; General Review; Online Computer File, 2001 |
| Nitric acid | −1.4 | Hollemann Wiberg, Lehrbuch der anorganischen Chemie [Inorganic Chemistry], 91st-100th edition, Walter de Gruyter Verlag, Berlin, New York, 1985, p. 603. |
| Sulfuric acid | −3 | Römpp Lexikon Chemie, 9th edition, Georg Thieme Verlag, Stuttgart, New York 1991, p. 3459. |
| Hydrochloric acid | −8 | |
| Hydrobromic acid | −9 | |

The counterions of these strong acids are selected from metal ions, metal-containing ions, phosphonium ions and unsubstituted ammonium ions. Preferred metal ions are alkaline earth metal cations, especially beryllium, magnesium, calcium, strontium and barium ions, and lithium and zirconium ions.

Metal-containing ions are ions that contain at least one metal but are not pure metal ions. They are preferably metal compound ions, for example tetraphenylstibonium ions.

The counterions may also be ammonium ions (NH$_4^-$) or optionally alkylated and/or arylated phosphonium ions. Very particular preference is given to ammonium ions.

Preferred salts of strong acids are calcium nitrate, magnesium bromide, zirconium(IV) chloride, indium chloride, bismuth chloride, copper tetrafluoroborate, calcium oxalate, lithium bromide and magnesium nitrate.

Preferred salts of strong acids are alkaline earth metal halides, including magnesium bromide in particular.

Preference is given to salts having good solubility in organic media (e.g. benzyl alcohol), i.e. salts having a solubility of at least 10 g/l in benzyl alcohol at 20° C. Salts such as calcium sulfate or barium sulfate are thus less preferred.

Preferably, the compositions according to the invention may further include d) amines not covered by the formula (I) and/or e) further auxiliaries or additives.

Amines d) not covered by the formula (I) are preferably di- or polyamines. These may be monomeric, oligomeric and/or polymeric compounds. Preferred monomeric and oligomeric compounds are selected from the group consisting of diamines, triamines and tetramines. The amine group of the di- or polyamines d) may be attached to a primary, secondary or tertiary carbon atom, preferably to a primary or secondary carbon atom. It is also possible to use mixtures of di- and/or polyamines as component d).

Components d) used with preference may be the following amines, alone or in mixtures:

aliphatic amines, especially the polyalkylenepolyamines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N''-1,2-ethanediylbis(1,3-propanediamine), dipropylenetriamine, adipic dihydrazide and hydrazine;

oxyalkylenepolyamines, preferably selected from polyoxypropylenediamine and polyoxypropylenetriamine (e.g. Jeffamine® D-230, Jeffamine® D-400, Jeffamine® T-403, Jeffamine® T-5000), 1,13-diamino-4,7,10-trioxatridecane, 4,7-dioxadecane-1,10-diamine;

cycloaliphatic amines preferably selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, TCD diamine (3(4),8(9)-bis(aminomethyl)tricyclo[5.2.1.0$^{2.6}$]decane), 4-methylcyclohexane-1,3-diamine;

araliphatic amines, preferably xylylenediamines;

aromatic amines, preferably phenylenediamines, especially phenylene-1,3-diamine and phenylene-1,4-diamine, and 4,4'-diaminodiphenylmethane, 2,4'-diaminodiphenylmethane, 2,2'-diaminodiphenylmethane, optionally alone or in mixtures of the isomers;

adduct hardeners, especially reaction products of epoxy compounds, especially glycidyl ethers of bisphenol A and F, with excess amine;

polyamidoamine hardeners, especially polyamidoamine hardeners obtained by condensation of mono- and polycarboxylic acids with polyamines, very especially by condensation of dimer fatty acids with polyalkylenepolyamines;

Mannich base hardeners, especially Mannich base hardeners obtained by reaction of mono- or polyhydric phenols with aldehydes, especially formaldehyde, and polyamines; and Mannich bases, especially based on phenol and/or resorcinol, formaldehyde and m-xylylenediamine, and also N-aminoethylpiperazine and blends of N-aminoethylpiperazine with nonylphenol and/or benzyl alcohol, phenalkamines which are obtained in a Mannich reaction from cardanols, aldehydes and amines.

It is also possible to use mixtures of the aforementioned di- or polyamines as component d).

The ratio of the epoxy groups in the epoxy resin to the sum total of all NH groups in all amines is 0.5:1 to 1.5:1, preferably 0.8:1 to 1.2:1, most preferably 0.9:1 to 1.1:1. "All amines" are understood to mean cyclic amines of the formula (I) and the amines d) not covered by formula (I). A corresponding reaction has the advantage that this increases the crosslinking density and the molar mass, and hence improves mechanical properties, chemical stability and scratch resistance. Moreover, no unreacted constituents remain in the coating, which can either enter into unwanted side reactions, migrate out of the coating or else at least lower heat distortion resistance as plasticizer.

Preferred further auxiliaries and admixtures e) may be the compounds customary in epoxy chemistry. Preferred auxiliaries and admixtures e) are pigments, solvents, levelling agents, modifiers, for example benzyl alcohol or nonylphenol, degassing agents, flatting agents, reactive diluents, and conventional catalysts such as salicylic acid.

In a preferred embodiment, no further amines d) not covered by the formula (I) are used. In a preferred embodiment, no further conventional catalysts are used, meaning that the possible auxiliaries and admixtures are limited to pigments, solvents, levelling agents, modifiers, degassing agents, flatting agents and reactive diluents.

The composition of components a) to e) in the composition according to the invention is preferably the following proportions by weight, based on the total mass of the composition:
- a) epoxy resin 30-95%
- b) cyclic amine 1-50%
- c) salt of the strong acid 0.001-5%, preferably 0.1-3%,
- d) further amine 0-48% and
- e) further auxiliaries or additives 0-48%.

Preferably, in addition, the proportion by weight of the amines b) based on the total mass of the amines b) and d) is at least 10% by weight, more preferably at least 30% by weight, even more preferably at least 50% by weight and more preferably still at least 70% by weight.

The invention further provides a process for producing a composition according to the invention, in which at least one epoxy resin a), at least one cyclic amine b) and at least one salt of a strong acid c) are mixed with one another.

The invention further provides for the use of the compositions according to the invention as a casting resin, coating composition, composite or adhesive or as a constituent thereof.

Experimental:

EXAMPLE 1

To demonstrate the particular reactivity of the catalysts claimed, model experiments are first compared with one another. For this purpose, 0.025 mol (3.75 g) of 1,2-epoxy-3-phenoxypropane is added to a mixture of 22.68 g of toluene (solvent) and 2.08 g of tetradecane (internal standard). To this are added 0.025 mol (2.13 g) of piperidine, and 0.06 g of the particular catalyst. Immediately after the mixing, a GC is taken and the content of 1,2-epoxy-3-phenoxypropane is compared with the content of tetradecane. After 4 h at room temperature, by means of GC analysis, the residual content of 1,2-epoxy-3-phenoxypropane (EP) is ascertained (calibrated by the internal tetradecane standard). This gives the following results:

| | Comparison of the catalysts | | |
|---|---|---|---|
| | Catalyst | % EP in the 0 sample | % EP after 4 hours at RT |
| 1* | No catalyst | 97 | 93 |
| 2* | Dibutyltin dilaurate | 99 | 93 |
| 3* | Diazabicyclononane (DBN) | 97 | 95 |
| 4* | Diazabicycloundecane (DBU) | 96 | 93 |
| 5* | Diazabicyclooctane (DABCO) | 94 | 93 |
| 6* | Zinc acetylacetonate | 94 | 90 |
| 7* | Tetrabutylammonium tribromide | 91 | 87 |
| 8* | Bismuth neodecanoate | 91 | 88 |
| 9* | Titanium tetrabutoxide | 95 | 94 |
| 10* | Salicylic acid | 93 | 90 |
| 11* | Phenol | 97 | 85 |
| 12 | Calcium nitrate | 93 | 36 |
| 13 | Magnesium bromide | 91 | 28 |
| 14 | Indium chloride | 94 | 35 |
| 15 | Bismuth chloride | 94 | 43 |
| 16 | Copper tetrafluoroborate | 93 | 33 |
| 17 | Calcium oxalate | 94 | 38 |
| 18 | Zirconium(IV) chloride | 89 | 33 |
| 19 | Lithium bromide | 95 | 34 |
| 20 | Magnesium nitrate | 98 | 33 |
| 21 | Calcium bromide | 98 | 79 |

*Non-inventive comparative experiments

EXAMPLE 2

12.2 g of bisphenol A diglycidyl ether (Epikote 828, Hexion), 2.8 g of aminoethylpiperazine (AEP, Aldrich) and 0.25 g of calcium nitrate (dissolved in 0.25 ml of ethanol, Accelerator 3130, Huntsman) were mixed well with one another and then subjected immediately to a DSC analysis (Mettler-Toledo, 10 K/min). An exothermic peak was measured with an onset of 47° C. and a maximum of 85° C.

COMPARATIVE EXAMPLE 3

12.2 g of bisphenol A diglycidyl ether (Epikote 828, Hexion) and 2.8 g of aminoethylpiperazine (AEP, Aldrich) were mixed well with one another and then subjected immediately to a DSC analysis (Mettler-Toledo, 10 K/min). An exothermic peak was measured with an onset of 61° C. and a maximum of 97° C.

The invention claimed is:
1. A composition comprising
   a) an epoxy resin selected from bisphenol A diglycidyl ether or bisphenol F diglycidyl ether, b) a cyclic amine of the formula (I)

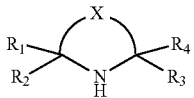
(I)

in which
wherein $R^1$, $R^2$, $R^3$ and $R^4$ =H, and $$X=-(Y^1)_m-(A^1)_n-(Y^2)_o-(A^2)_p-(Y^3)_q-(A^3)_r-(Y^4)_s- \quad (II)$$

wherein,
m, n, o, p, q, r and s=0 or 1, provided that at least one of m, n, o, p, q, r, and s is 1
$A^1$, $A^2$, $A^3$ have the formula (III))

$$-(CR^7R^8)_x-(CR^9=CR^{10})_y-(CR^{11}R^{12})_z- \quad (III)$$

wherein
$R^7$, $R^8$, $R^9$, $R^{10}$, $R^{11}$ and $R^{12}$=H or organic radical and
$1 \leq x+y+z \leq 7$ and
$Y^1$, $Y^2$, $Y^3$, $Y^4$=$NR^5$, $PR^5$, O or S, where $R^5$ independently=organic radical,
where any two organic radicals $R^5$, $R^7$, $R^8$, $R^9$, $R^{10}$, $R^{11}$ or $R^{12}$ optionally form one or more further rings,
wherein at least one radical present as $R^5$, $R^7$, $R^8$, $R^9$, $R^{10}$, $R^{11}$ or $R^{12}$ is present and is substituted by a —$NHR^6$ or —$NH_2$ group, where $R^6$=organic radical,
c) a salt of a Brønsted acid having a pKa of between 2 and −9.0, selected from the group consisting of calcium nitrate, magnesium bromide, zirconium(IV) chloride, indium chloride, bismuth chloride, copper tetrafluoroborate, calcium oxalate, lithium bromide and magnesium nitrate, and
d) an amine not covered by the part b), wherein the percentage by weight of the cyclic amine b) based on the total weight of the amines b) and d) is at least 10% by weight, and
wherein the ratio of the epoxy groups in the epoxy resin to the sum total of all NH groups in all amines is 0.5:1 to 1.5:1.

2. The composition according to claim 1, wherein the percentage by weight of the cyclic amine b) based on the total weight of the amines b) and d) is at least 30% by weight.

3. The composition according to claim 2, wherein the percentage by weight of the cyclic amine b) based on the total weight of the amines b) and d) is at least 50% by weight.

4. The composition according to claim 1, wherein
$R^7$, $R^8$, $R^{11}$ and $R^{12}$=H
and the sum total of x, 0.5 y, z, m, o, q, and s is from 2 to 8, and
wherein the percentage by weight of the cyclic amine b) based on the total weight of the amines b) and d) is at least 70% by weight, and
X in formula (II) has a chain length of from 2 to 15 atoms.

5. The composition according to claim 1, wherein X in formula (II) has a chain length of 2 to 15 atoms.

6. The composition according to claim 1, wherein X has the formula (IIa)

$$X=-(CR^7R^8)_x-(Y)_o-(CR^{11}R^{12})_z- \quad (IIa)$$

wherein
x and z=0, 1, 2, 3, 4, 5, 6 or 7,
o=0 or 1, $2 \leq x+o+z \leq 15$
$R^7$, $R^8$, $R^{11}$, $R^{12}$=H or organic radical and
Y=$NR^5$, $PR^5$, O or S, where $R^5$=organic radical
wherein the percentage by weight of the cyclic amine b) based on the total weight of the amines b) and d) is at least 50% by weight.

7. The composition according to claim 6, wherein x=1, 2, 3 or 4, o=0 or 1 and z=0, 1 or 2
wherein the percentage by weight of the cyclic amine b) based on the total weight of the amines b) and d) is at least 50% by weight.

8. The composition according to claim 1, further comprising
e) auxiliaries or additives.

9. The composition according to claim 8, wherein the amine d) is selected from the group consisting of
aliphatic amines,
oxyalkylenepolyamines
cycloaliphatic amines,
araliphatic amines,
aromatic amines
adduct hardeners,
polyamidoamine hardeners
Mannich base hardeners and
Mannich bases.

10. The composition according to claim 8, wherein the percentage by weight of the cyclic amine b) based on the total weight of the amines b) and d) is at least 30% by weight.

11. The composition as claimed in claim 1, wherein
component a) is present in an amount from 30 to 95% by weight based on the total weight of the composition; wherein component b) is present in an amount from 1 to 50% by weight based on the total weight of the composition; wherein component c) is present in an amount of from 0.001 to 5% by weight based on the total weight of the composition; wherein the composition optionally further comprises e) auxiliaries or additives in an amount of up to 48% by weight based on the total weight of the composition; and wherein the percentage of b) based on total weight of b) and d) is from 70 to 98% by weight.

12. A process for producing a composition according to claim 1, wherein the epoxy resin a), the cyclic amine b) the salt of a Brønsted acid c) and the amine d) are mixed with one another, wherein the percentage by weight of the cyclic amine b) based on the total weight of the amines b) and d) is at least 50% by weight.

13. A process for producing a composition according to claim 12, wherein X in formula (II) has a chain length of 2 to 15 atoms.

14. A composite comprising the composition according to claim 1.

15. A casting resin comprising the composition according to claim 1.

16. A coating composition comprising the composition according to claim 1.

17. An adhesive comprising the composition according to claim 1.

18. A composition comprising
a) an epoxy resin selected from bisphenol A diglycidyl ether or bisphenol F diglycidyl ether,
b) a cyclic amine selected from the group consisting of aminoethylpiperazine (AEP, 1-(2-aminoethyl)piperazine), 1-(3-aminopropyl)piperazine, 1-imidazolidinoethanamine, imidazolidino-N-propanamine, .alpha.-methyl-l-piperazinethanamine, 2,6-dimethyl-1- piperazinoethanamine, 2-amino-1-(piperazin-1-yl)ethanone, 4-(2-aminoethyl)piperidine, 3-(2-aminoethyl)piperidine, 2-(2-aminoethyl)piperidine, and triazinane, c) a salt of a Brønsted acid having a pKa of between 2 and −9 selected from the group consisting of calcium nitrate, magnesium bromide, zirconium(IV) chloride, indium chloride, bismuth chloride, copper tetrafluoroborate, calcium oxalate, lithium bromide and magnesium nitrate, and d) an amine not covered by the part b), wherein the percentage by weight of the cyclic amine b) based on the total weight of the amines b) and d) is at least 50% by weight, and wherein the ratio of the epoxy groups in the epoxy resin to the sum total of all NH groups in all amines is 0.9:1 to 1.1:1.

19. A composition comprising a) an epoxy resin selected from bisphenol A diglycidyl ether or bisphenol F diglycidyl ether, b) a cyclic amine selected from the group consisting of aminoethylpiperazine (AEP, 1-(2-aminoethyl)piperazine), 1-(3-aminopropyl)piperazine, 1-imidazolidinoethanamine, imidazolidino-N-propanamine, .alpha.-methyl-1-piperazinethanamine, 2,6-dimethyl-1-piperazinoethanamine, 2-amino-1-(piperazin-1-yl)ethanone, 4-(2-aminoethyl)piperidine, 3-(2-aminoethyl)piperidine and 2-(2-aminoethyl)piperidine, c) a salt of a Brønsted acid selected from the group consisting of calcium nitrate, magnesium bromide, zirconium(IV) chloride, indium chloride, bismuth chloride, copper tetrafluoroborate, calcium oxalate, lithium bromide and magnesium nitrate, d) an amine not covered by the part b), wherein the percentage by weight of the cyclic amine b) based on the total weight of the amines b) and d) is at least 10% by weight, where the ratio of the epoxy groups in the epoxy resin to the sum total of all NH groups in all amines is 0.5:1 to 1.5:1.

* * * * *